INVENTORS
L. D. KLEISS
L. W. MORGAN
BY Hudson & Young
ATTORNEYS

United States Patent Office 2,917,437
Patented Dec. 15, 1959

2,917,437

FLUID SEPARATION PROCESS CONTROL

Louis D. Kleiss, Borger, Tex., and Lyman W. Morgan, Bartlesville, Okla., assignors to Phillips Petroleum Company, a corporation of Delaware Application June 10, 1957, Serial No. 664,610

10 Claims. (Cl. 202—160)

This invention relates to a method of and apparatus for controlling processes involving the separation of fluid mixtures into their various components.

Butadiene has many uses in the plastic and synthetic rubber fields. A considerable amount of research and development has been done in recent years to improve the yield of butadiene obtainable from other hydrocarbons, as by the dehydrogenation of selected hydrocarbons in the presence of a suitable catalyst. One such method involves dehydrogenating butane to butenes, separating the butenes from lower and higher boiling hydrocarbons, further dehydrogenating the butenes to butadiene, and recovering the butadiene. In both of these dehydrogenating steps, some of the original hydrocarbons are not dehydrogenated, and other hydrocarbons are produced. In order to obtain butadiene having the necessary purity required for successful polymerization, means must be provided for separating butadiene from the other hydrocarbons which are normally formed along with the butadiene by the cracking or dehydrogenation steps. Under present synthetic rubber manufacturing conditions, it is required that the butadiene purity be not less than approximately 98 mol percent, and preferably not less than 99 mol percent. One particular process which has been found to be valuable in accomplishing the separation of the butadiene from the effluent of the second dehydrogenation step is described in United States Patent 2,415,006. According to that process, $C_3$ and lighter materials are fractionated off of the dehydrogenation effluent in a first fractionator, $C_5$ and heavier constituents, along with some butene-2, are removed in a second fractionation zone, the butene-1, isobutylene, and butane are then removed in an extractive distillation zone, and, finally, the butadiene is separated from the vinylacetylene and butene-2 in another fractionation zone.

As is well known to those familiar with refining operations, extractive distillation is a fractionation process wherein a relatively non-volatile substance is added to the fractionating system to change and improve the volatility relationships of the substances being separated. Normally, the fractionating column is similar to those used for ordinary fractionation, and includes a tower containing a plurality of spaced bubble trays, or the like, at which the vapors and liquid make contact with one another. The feed mixture generally is supplied at some intermediate point in the column, and the overhead vapors may be condensed with a portion thereof returned to the column as reflux and a second portion removed as a product stream. The selective solvent is introduced a few contacting steps below the reflux entry in order that traces of the vaporized solvent can be recovered through the reflux operation. The bottom of the column normally is supplied with a reboiler to generate the necessary stripping vapor.

In the butadiene purification system, the purpose of the extractive distillation unit is to remove isobutane, normal butane, isobutylene, and butene-1 from the butadiene. These components are difficult or impossible to remove from butadiene by straight fractionation. Of these components, the isobutylene and butene-1 are the most difficult to remove by extractive distillation. Since isobutylene is present in only very small amounts and butene-1 is present in comparatively large quantities, by controlling the concentration of the butene-1 on a selected tray between the column feed and the bottom of the column within narrow limits, the butene-1 can be retained within allowable limits and the loss of butadiene in the overhead kept to a minimum.

In accordance with the present invention there is provided a fractionation column control system which is particularly adapted for use with an extractive distillation column. Heat normally is supplied to the reboiler of the column at a constant rate by means of a flow controller which regulates the admission of the heating medium. A temperature controller provides an output signal representative of the temperature in the lower region of the column. This signal resets the flow controller as required to tend to maintain the temperature in the lower region of the column at a constant preselected value. A sample stream is withdrawn continuously from the region of the column above the point at which the temperature is measured. This sample stream is directed to an analyzer which provides an output signal representative of the concentration of a particular constituent or group of constituents of the fluid mixture being separated. The output signal of the analyzer resets the temperature controller so as to tend to maintain the concentration of the measured constituent constant at a preselected value. This override control system operates in an efficient manner to maintain desired product purity.

Accordingly, it is an object of this invention to provide an improved method of controlling the operation of a fractionation process.

A further object is to provide a control system for the extractive distillation separation of butadiene from butene-1 in the presence of other hydrocarbons having four carbon atoms per molecule.

A further object is to provide a control system for an extractive distillation column wherein the heat supplied to the column is controlled in response to a measurement of temperature in the column which in turn is regulated by an analysis of a sample stream removed from the column.

Other objects, advantages, and features of this invention should become apparent from the following detailed description which is taken in conjunction with the accompanying drawing in which.

Figure 1:
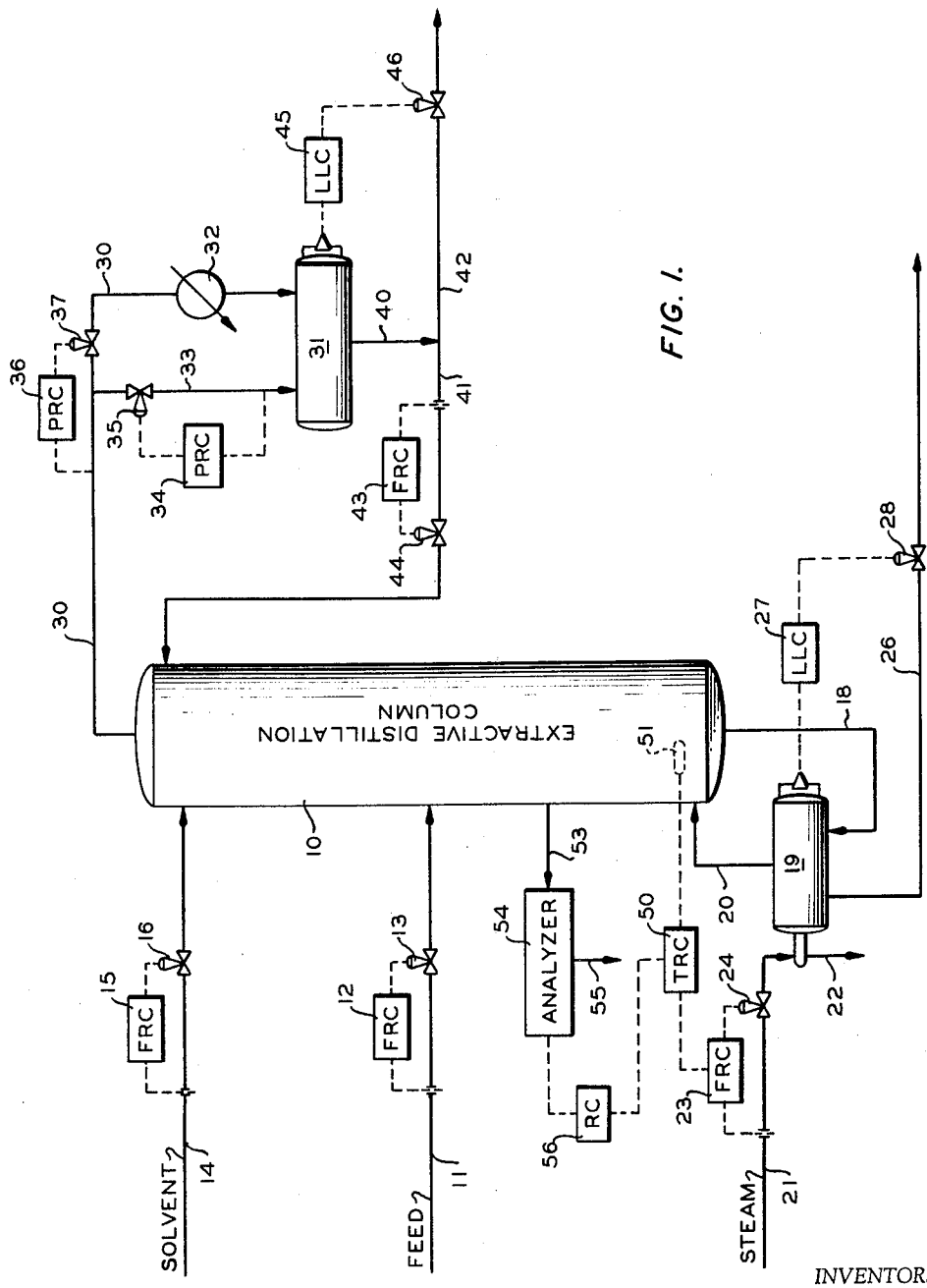
Figure 1 is a schematic view of a distillation column having the control system of the present invention incorporated therein.

Referring now to the drawing in detail and Figure 1 in particular, there is shown an extractive distillation column 10 of any suitable design employing contacting means such as perforated plates, bubble decks, or the like. The fluid mixture to be separated is supplied to column 10 through an inlet conduit 11 at a constant rate which is maintained by a flow recorder-controller 12 which regulates a valve 13. The feed mixture thus supplied to an intermediate region of column 10 is separated into a liquid kettle product which is withdrawn from the lower region of the column and an overhead vapor product which is withdrawn from the upper region of the column. A solvent which selectively absorbs certain constituents of the feed mixtures is introduced into the upper region of column 10 through a conduit 14. The flow through conduit 14 is maintained at a constant value by a flow recorder-controller 15 which adjusts a valve 16.

Liquid is withdrawn from the bottom of column 10 through a conduit 18 which communicates with a reboiler 19. The heated liquid is returned to column 10 through a conduit 20. Steam, or other heating medium, is supplied to reboiler 19 by means of a conduit 21. Steam condensate is removed through a conduit 22. The flow of steam is regulated by a flow recorder-controller 23 which adjusts a valve 24. A kettle product stream is removed from reboiler 19 through a conduit 26. A liquid level controller 27 regulates a valve 28 in conduit 26 so as to tend to maintain a constant liquid level in reboiler 19.

The vapors comprising the relatively light components of the feed mixtures supplied to column 10 are removed from the upper region of the column by means of a conduit 30 which communicates with an accumulator 31 through a condenser 32. A conduit 33 is connected between conduit 30 and accumulator 31 to permit a portion of the vapors to by-pass condenser 32. The flow through conduit 33 is adjusted by a pressure recorder-controller 34 which adjusts a valve 35 to tend to maintain a constant pressure in accumulator 31. The flow through condenser 32 is regulated by a pressure recorder-controller 36 which regulates a valve 37 to tend to maintain a constant pressure on column 10. The condensed liquid in accumulator 31 is withdrawn through a conduit 40 which communicates with conduits 41 and 42. Conduit 41 returns a portion of the condensed vapors to column 10 as reflux. The flow through conduit 41 is maintained at a constant value by means of a flow recorder-controller 43 which adjusts a valve 44. Conduit 42 removes the overhead product stream. The flow through conduit 42 is regulated by a liquid level controller 45 which adjusts a valve 46 to tend to maintain a constant liquid level in accumulator 31.

Figure 2:
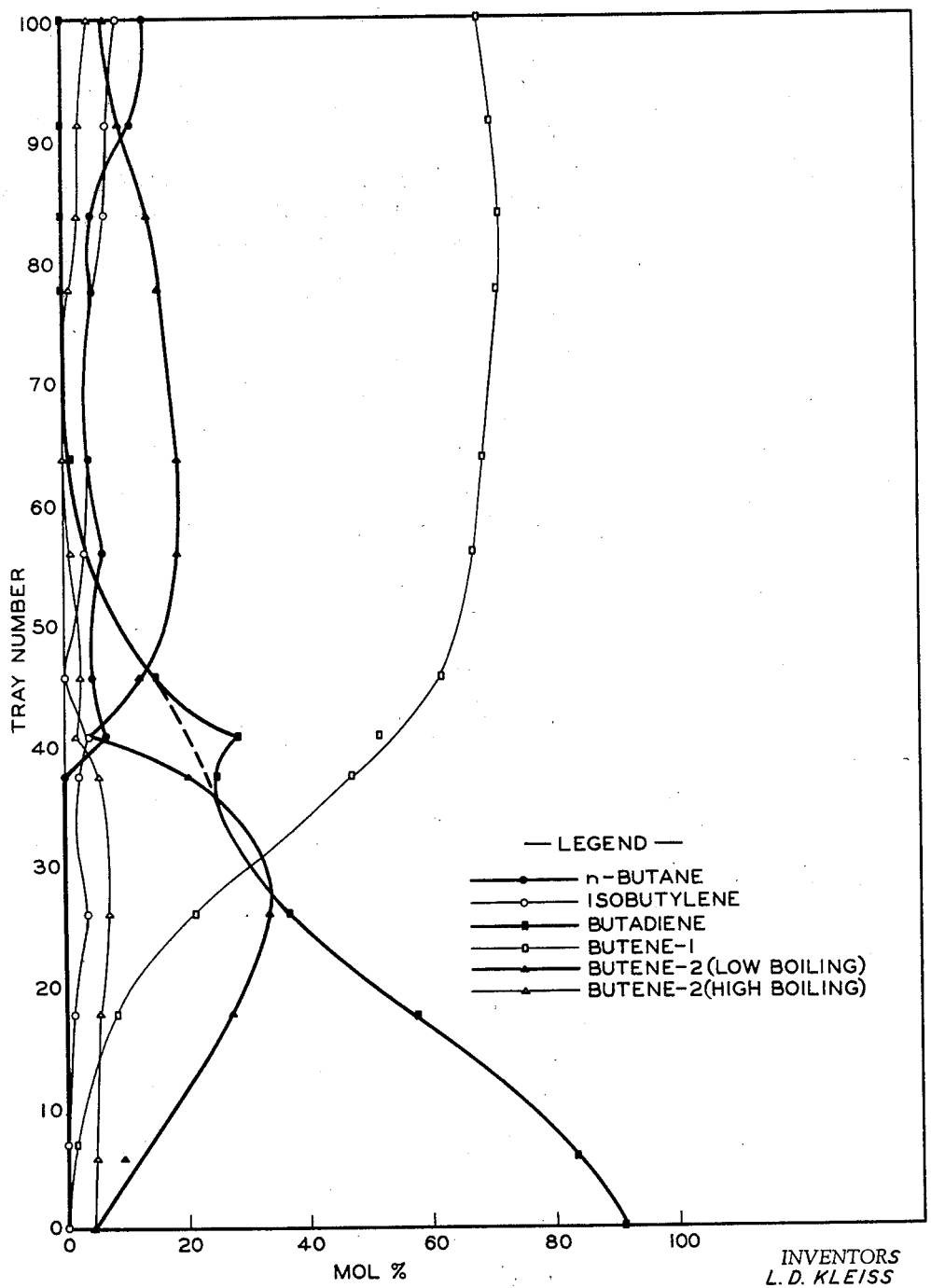
Figure 2 is a graphical representation of the concentrations of the constituents of a fluid mixture which can be separated by the control procedure of the present invention.
Figure 4:
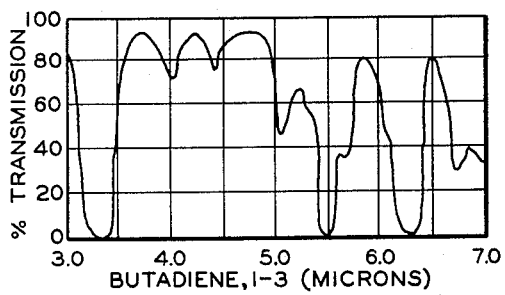
Figure 4 is a graphical representation of the infrared transmission properties of butadiene 1-3.
Figure 5:
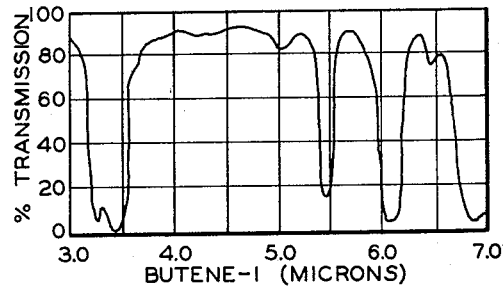
Figure 5 is a graphical representation of the infrared transmission properties of butene-1.
Figure 6:
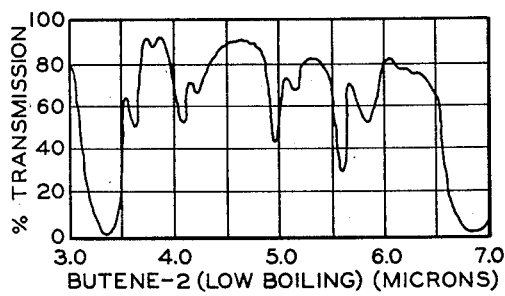
Figure 6 is a graphical representation of the infrared transmission properties of butene-2, low boiling.
Figure 7:
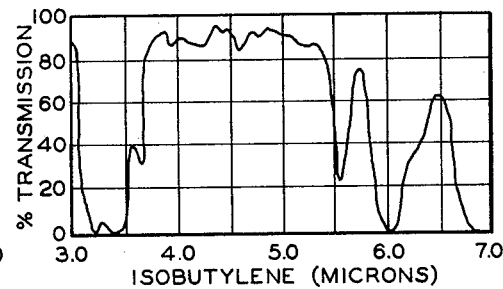
Figure 7 is a graphical representation of the infrared transmission properties of isobutylene.

For purposes of explaining the control system of this invention, reference is made to a particular separation of butadiene from butene-1 in the presence of certain other hydrocarbons having four carbon atoms per molecule. Figure 2 illustrates typical concentrations of such a fluid mixture within column 10. In this particular example, the feed mixture is supplied to tray No. 40 (numbered from the bottom upward) of a column having 100 trays. Furfural, containing approximately six percent water, is supplied to tray No. 95 of the column as the selective solvent. Conduit 41 enters column 10 at tray No. 100. Column 10 is operated so that the pressure at the top of the column is 50 p.s.i.g. and the temperature is 115° F. The temperature at the bottom of the column is 285° F. Accumulator 31 is maintained at a temperature of 85° F. and at a pressure of 35 p.s.i.g. From an inspection of Figure 2 can be seen that the kettle product comprises a major percent of butadiene whereas the remaining constituents are removed primarily as overhead product. In normal operation the kettle product stream is subsequently directed to a stripper column, not shown, which removes the furfural.

In accordance with the present invention, a temperature recorder-contoller 50 provides an output signal which is representative of the temperture in a lower region 51 of column 10. Region 51 can represent the first tray of the column, for example. The output signal of controller 50 operates to reset controller 23 in response to temperature variations in the column so that the flow of steam is adjusted to tend to maintain a constant temperature within the column at region 51. If the temperature in the column should decrease below a desired value, for example, additional steam is supplied to reboiler 19.

A sample stream is withdrawn from column 10 through a conduit 53 which communicates with the inlet of an analyzer 54. This sample stream is subsequently vented from the analyzer by a conduit 55. In the above described example, the sample stream is withdrawn from tray No. 30 in the column. Analyzer 54 provides an output signal which is representative of the concentration of one of the constituents of the fluid mixture being separated. In the described example, analyzer 54 provides an output signal representative of the concentration of butene-1. The output signal of analyzer 54 is applied through a recorder-controller 56 which resets controller 50. Such a change in the demand point of controller 50 results in the steam rate being changed if the temperature in region 51 is not the same as the new set point of controller 50. If the measured concentration of butene-1 should tend to increase, for example, additional steam is required in reboiler 19 to vaporize a greater portion of the fluid mixture being separated. If the measured concentration of butene-1 should decrease, less steam is required in the column. The control system provides the correct amount of steam.

Figure 3:
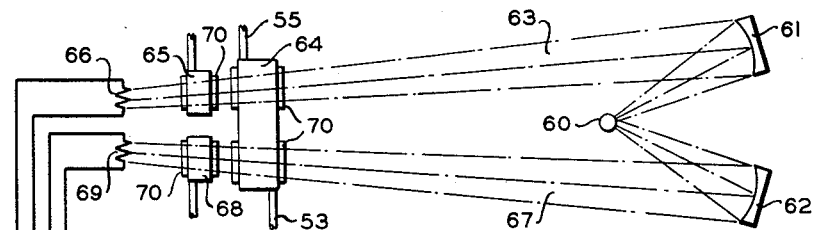
Figure 3 is a schematic representation of an infrared analyzer which can be employed in the control system of Figure 1.

Analyzer 54 can advantageously be a double beam infrared analyzer of the configuration illustrated in Figure 3. Infrared radiation from a source 60 is directed against a pair of front surface concave reflectors 61 and 62. The beam 63 from reflector 61 is transmitted through a sample cell 64 and a filter cell 65 to impinge upon a first temperature sensitive resistance element 66. The beam 67 from reflector 62 is transmitted through sample cell 64 and an interference cell 68 to impinge upon a second temperature sensitive resistance element 69. Conduits 53 and 55 communicate with sample cell 64. Cells 64, 65, and 68 are provided with windows 70 which transmit radiation in the regions of interest. These windows can be formed of quartz, or from a halide such as silver chloride, calcium chloride, or sodium chloride.

Resistance element 66 and 69 are connected to a measuring circuit which forms a portion of a recorder 71. The measuring circuit can be in the form of a Wheatstone bridge of the type shown in U.S. Patent 2,579,825, for example. The recorder 71 provides an electrical output signal which is of amplitude proportional to the measured concentration of butene-1. This electrical signal is converted into a corresponding pneumatic pressure by means of record-controller 56. The various control instruments illustrated in Figure 1 can be conventional apparatus which is well known to those skilled in the art and which can be purchased commercially at the present time from several manufacturers.

The analyzer of Figure 3 can be sensitized approximately equally to butene-1 and isobutylene in the 5.95 to 6.20 micron region. By positioning an atmosphere of butene-1 in cell 68, a significant difference is created initially in the amount of radiation impinging upon the two detectors in the 3.15 to 3.55, 5.40 to 5.50, 5.95 to 6.20 and 6.55 to 7.55 micron regions. The 5.40 to 5.50 micron region is rendered ineffective due to the absorption of practically all the energy in this region by the relatively large concentrations of butadiene in sample cell 64. Atmospheres of butene-2 are disposed in cells 65 and 68 as an interference gas to remove most of the energy from both beams at the 3.15 to 3.55 and 6.55 to 7.75 micron regions without seriously decreasing the energy transmitted at the 5.95 to 6.20 micron region. Thus, the instrument is sensitized at the 5.95 to 6.20 micron region so that nearly equal instrument response is obtained for concentration changes in butene-1 and isobutylene. The output signal of the analyzer is thus representative of these changes.

This effectively provides a measurement of the butene-1 concentration.

If the composition of the feed stream to column 10 remains substantially constant, the illustrated control system normally maintains a constant separation. Controller 23 adjusts valve 24 to tend to maintain a constant flow of steam through reboiler 19. If the normal operation of the column should be upset for any reason, the temperature at region 51 may deviate from the desired value. Controller 50 then resets controller 23 to change the rate of steam addition to reboiler 19 so as to restore the desired temperature to region 51. Region 51 normally is located near the bottom of column 10 so as to minimize the time lag for heat transfer from reboiler 19 to this region. Sample conduit 53 preferably is connected to column 10 at a region where the concentration of butene-1 changes rapidly and in a linear manner with respect to the height of the column. From an inspection of Figure 2 it can be seen that tray No. 30 is an ideal point for the sample stream withdrawal. The butene-1 is present in considerably greater concentration than the isobutylene, and thus contributes the most to the analysis. If the indicated concentration of butene-1 should change, controller 50 is reset in the manner previously described. This forms the third control loop for the rate of heat additional to reboiler 19.

In view of the foregoing description it should be evident that there is provided in accordance with this invention an improved control system for a fractionation column. The control system is applicable to nearly any type of fractionation column, but is particularly effective for use with extractive distillation columns.

While the invention has been described in combination with a present preferred embodiment, it should be evident that it is not limited thereto.

What is claimed is:

1. In a fractionation system including a fractionation column, means to introduce a fluid mixture to be separated into said column, means to withdraw an overhead stream from said column, means to withdraw a kettle stream from said column, and means to introduce a solvent into said column; a control system comprising means to supply heat to the lower region of said column, means to control the rate of heat supply, means to detect the temperature in a lower region of said column, means responsive to said means to detect temperature to reset said means to control the rate of heat supply thereby to control the temperature at said lower region, means to withdraw a sample stream from said column at a second region above said lower region, means to analyze said sample stream, and means responsive to said means to analyze to further reset said means to control the rate of heat supply whereby the concentration of a constituent of the fluid mixture to be separated is maintained substantially constant at said second region.

2. In a fractionation system including a fractionation column, means to introduce a fluid mixture to be separated in said column, means to withdraw an overhead stream from said column, means to withdraw a kettle stream from said column, and means to introduce a solvent into said column; a control system comprising means to supply a heated fluid stream to the lower region of said column, means to regulate the rate of fluid flow thereby to control the rate of heat supply, a temperature sensing element disposed in the lower region of said column, second control means responsive to said temperature sensing element to reset said means to regulate thereby to control the temperature at said lower region, means to withdraw a sample stream from said column at a second region above said lower region, means to analyze said sample stream, and means responsive to said means to analyze to reset said second control means.

3. In a fractionation system including a fractionation column having a reboiler associated therewith, means to supply a fluid heating medium to said reboiler, means to introduce a fluid mixture to be separated into said column, means to withdraw an overhead stream from said column, means to withdraw a kettle stream from said column, and means to introduce a solvent into said column; a control system comprising flow control means associated with said means to supply heating medium to regulate the flow of heating medium, means to detect the temperature in a lower region of said column, means responsive to said means to detect temperature to reset said flow control means to control the temperature at said lower region, means to withdraw a sample stream from said column at a second region above said lower region, means to analyze said sample stream, and means responsive to said means to analyze to further reset said flow control means.

4. In a fractionation system adapted to separate a fluid mixture comprising butadiene, butenes and other hydrocarbons having four carbon atoms per molecule into a first stream comprising a major percent butadiene and a second stream comprising a major percent butenes, a fractionation column, means to introduce a fluid mixture to be separated into said column, means to withdraw an overhead stream from said column, means to withdraw a kettle stream from said column, and means to introduce a solvent into said column; a control system comprising means to supply heat to the lower region of said column, means to control the rate of heat supply, means to detect the temperature in a lower region of said column, means responsive to said means to detect temperature to reset said means to control, means to withdraw a sample stream from said column at a second region above said lower region, means to analyze said sample stream to determine the concentration of butene-1 therein, and means responsive to said means to analyze to further reset said means to control.

5. The control system of claim 4 wherein said means to analyze comprises a source of infrared radiation, first and second radiation detectors, means to direct first and second beams of radiation from said source to said first and second detectors, respectively, a sample cell disposed in the two beams, said sample cell being provided with inlet and outlet openings through which the sample stream can be circulated, a filter cell disposed in said first beam, and means to provide an output signal representative of the ratio of radiation impinging upon said first and second detectors.

6. The control system of claim 5 wherein said filter cell contains a mixture of butene-1 and butene-2, and further comprising a second filter cell in said second beam containing butene-1.

7. In a fractionation system including a fractionation column, means to introduce a fluid mixture to be separated into said column, means to withdraw an overhead stream from said column, and means to withdraw a kettle stream from said column; a control system comprising means to supply heat to the lower region of said column, means to regulate the rate of heat supply, means to detect the temperature in a lower region of said column, means responsive to said means to detect temperature to reset said means to regulate, means to withdraw a sample stream from said column at a second region above said lower region, means to analzye said sample stream, and means responsive to said means to analyze to further reset said means to regulate.

8. A fractionation system comprising a fractionation column having an external reboiler associated therewith, first conduit means communicating with an intermediate region of said column to supply a feed mixture to be separated, first flow control means associated with said first conduit means to regulate the flow therethrough, an accumulator, a condenser, second conduit means communicating between the top of said column and said accumulator through said condenser, third conduit means communicating between said accumulator and said column to return condensed material to said column as reflux, second flow control means associated with said third conduit means to regulate the flow therethrough, fourth conduit means communicating with said accumulator to remove an overhead product stream, third flow control means responsive to the liquid level in said accumulator to regulate flow through said fourth conduit means, fifth conduit means communicating with said reboiler to supply a heating medium, fourth flow control means associated with said fifth conduit means to regulate the flow therethrough, sixth conduit means communicating with an upper region of said column to supply a solvent, fifth flow control means associated with said sixth conduit means to maintain a uniform flow therethrough, means to detect the temperature in a lower region of said column, means responsive to said means to detect temperature to reset said fourth flow control means, means to withdraw a sample stream from said column at a second region above said lower region, means to analyze said sample stream, and means responsive to said means to analyze to further reset said fourth flow control means.

9. A fractionation system comprising a fractionation column having an external reboiler associated therewith, first conduit means communicating with an intermediate region of said column to supply a feed mixture to be separated, first flow control means associated with said first conduit means to regulate the flow therethrough, an accumulator, a condenser, second conduit means communicating between the top of said column and said accumulator through said condenser, third conduit means communicating between said accumulator and said column to return condensed material to said column as reflux, second flow control means associated with said third conduit means to regulate the flow therethrough, fourth conduit means communicating with said accumulator to remove an overhead product stream, third flow control means responsive to the liquid level in said accumulator to regulate flow through said fourth conduit means, fifth conduit means communicating with said reboiler to supply a heating medium, fourth flow control means associated with said fifth conduit means to regulate the flow therethrough, sixth conduit means communicating with an upper region of said column to supply a solvent, fifth flow control means associated with said sixth conduit means to control flow therethrough, a temperature sensing element disposed in the lower region of said column, means responsive to said temperature sensing element to reset said fourth control means to tend to maintain a constant temperature at said lower region, means to withdraw a sample stream from said column at a second region above said lower region, means to analyze said sample stream, and means responsive to said means to analyze to reset said means responsive to said temperature sensing element.

10. The control system of claim 9 wherein said means to analyze comprises a source of infrared radiation, first and second radiation detectors, means to direct first and second beams of radiation from said source to said first and second detectors, respectively, a sample cell disposed in the two beams, said sample cell being provided with inlet and outlet openings through which the sample stream can be circulated, a filter cell disposed in said first beam, and means to provide an output signal representative of the ratio of radiation impinging upon said first and second detectors.

References Cited in the file of this patent

UNITED STATES PATENTS

| | | |
|---|---|---|
| 2,366,361 | Semon | Jan. 2, 1945 |
| 2,379,110 | Souders | June 26, 1945 |
| 2,386,831 | Wright | Oct. 16, 1945 |
| 2,415,006 | Hachmuth | Jan. 28, 1947 |
| 2,419,528 | Biegel | Apr. 29, 1947 |
| 2,459,404 | Anderson | Jan. 18, 1949 |
| 2,486,929 | Dean | Nov. 1, 1949 |
| 2,529,030 | Latchum | Nov. 7, 1950 |
| 2,684,326 | Boyd | July 20, 1954 |
| 2,696,464 | Mathis | Dec. 7, 1954 |
| 2,709,678 | Berger | May 31, 1955 |
| 2,764,536 | Hutchins | Sept. 25, 1956 |

OTHER REFERENCES

Industrial and Engineering Chemistry, vol. 39, No. 5, June 1947, pages 695–705.